(12) United States Patent
Boggs et al.

(10) Patent No.: US 11,914,763 B1
(45) Date of Patent: Feb. 27, 2024

(54) SYSTEM AND METHOD FOR CONFORMAL HEAD WORN DISPLAY (HWD) HEADTRACKER ALIGNMENT

(71) Applicant: Rockwell Collins, Inc., Cedar Rapids, IA (US)

(72) Inventors: Christopher M. Boggs, Gainesville, VA (US); Gavin P. Haentjens, Arlington, VA (US); William T. Kirchner, Ashburn, VA (US); Brandon E. Wilson, Portland, OR (US); Kurt I. Jaeger, Catlett, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/953,227

(22) Filed: Sep. 26, 2022

(51) Int. Cl.
*G09G 5/00* (2006.01)
*G06F 3/01* (2006.01)
(Continued)

(52) U.S. Cl.
CPC ............. *G06F 3/012* (2013.01); *B64D 47/08* (2013.01); *G06T 7/73* (2017.01); *G06T 19/20* (2013.01);
(Continued)

(58) Field of Classification Search
CPC ........ B60K 2370/1529; B60K 2370/92; B60K 35/00; G02B 2027/0138; G02B 2027/014;
(Continued)

(56) References Cited

U.S. PATENT DOCUMENTS 9,323,056 B2 4/2016 Williams
9,785,231 B1 10/2017 Zimmerman et al.
(Continued)

FOREIGN PATENT DOCUMENTS

EP 3398006 A4 9/2019
FR 2983330 B1 6/2014
IN 394357 4/2022

OTHER PUBLICATIONS

Wagemakers, Andrew (2017) Calibration Methods for Head-Tracked 3D Displays [Masters thesis, University of Saskatchewan]. https://core.ac.uk/download/pdf/226118531.pdf.

*Primary Examiner* — Insa Sadio
(74) *Attorney, Agent, or Firm* — Suiter Swantz pc llo

(57) ABSTRACT

A system and method for conformal alignment of an aircraft-based head worn display (HWD) system defines far-field features in view of the HWD display, each far-field feature having a 3D truth position in a navigational reference frame. The aircraft GPS/IRS determines pointing vectors to each feature in the aircraft reference frame. The HWD user estimates a nominal head pose for orienting the far-field features in the HWD display, and the HWD system renders the far-field features based on the nominal head pose and pointing vectors. The rendered far-field features are aligned to their real-world 3D truth positions (either manually or with the assistance of witness cameras) and a latched pose of the HWD headtracker system determined based on a successful alignment within accuracy bounds. Based on the latched headtracker pose, the HWD headtracker alignment and the alignment of the HWD display reference frame to the aircraft reference frame are updated.

14 Claims, 10 Drawing Sheets

(51) Int. Cl.
*G06T 7/73* (2017.01)
*B64D 47/08* (2006.01)
*G06T 19/20* (2011.01)

(52) U.S. Cl.
CPC .............. *G06T 2207/30204* (2013.01); *G06T 2219/2004* (2013.01)

(58) Field of Classification Search
CPC ..... G02B 27/0101; G06F 3/013; G06F 3/147; G06T 19/006; G06T 19/20; G06T 2207/30268; G06T 2219/2004; G06T 7/50; G09G 2380/10
See application file for complete search history.

(56) References Cited

U.S. PATENT DOCUMENTS

| | | | |
|---|---|---|---|
| 9,874,931 B1 | | 1/2018 | Koenck et al. |
| 10,223,835 B2* | | 3/2019 | Cashen .............. G02B 27/0101 |
| 11,386,572 B2 | | 7/2022 | Azimi et al. |
| 2020/0363867 A1* | | 11/2020 | Azimi .................... G06F 3/013 |

* cited by examiner

SYSTEM AND METHOD FOR CONFORMAL HEAD WORN DISPLAY (HWD) HEADTRACKER ALIGNMENT

BACKGROUND

Head worn display (HWD) systems (e.g., helmet mounted displays (HMD)) often render (e.g., as symbology or graphical elements) georeferenced objects. If the rendered georeferenced objects do not conform to their real-world views (e.g., within allowable tolerance), the rendered symbology may constitute hazardously misleading information (HMI). Crucial to ensuring HWD conformality is the alignment of the HWD headtracking system to the aircraft platform. For example, the headtracker determines an accurate position and orientation (e.g., pose) of a head of the pilot or crewmember wearing the HWD, relative to the aircraft reference frame (e.g., body frame, platform frame) in order to ensure that imagery and symbology displayed by the HWD is consistent with what the wearer is currently looking at.

The kinematic chain includes numerous points where conformality errors may arise and accumulate, e.g., object databases; aircraft navigation and positioning systems (e.g., GPS/IRS); errors in pose estimation by the headtracker system; errors in extrinsic alignment of the headtracker hardware to the aircraft frame; calibrations and/or distortions associated with the HWD display; and/or windshield distortions. While there are multiple ways to align the headtracker system, any of these ways may introduce conformality errors

SUMMARY

An aircraft-based head worn display (HWD) system is disclosed. In embodiments, the HWD system includes absolute and relative aircraft positioning systems, e.g., GPS/IRS, for determining a position and orientation (pose) of the aircraft in a navigational reference frame. In embodiments, the HWD system includes a display unit for presenting imagery to the HWD wearer, e.g., a pilot, crewmember or other user; the display unit having a display reference frame. The HWD system includes an optical/inertial headtracker for estimating a relative pose of a first optical frame (e.g., a camera frame) relative to a second optical frame (e.g., a marker frame). The HWD system has a normal mode and an external feature alignment mode wherein the alignment of the display reference frame to the platform reference frame of the aircraft may be revised and/or corrected. For example, in alignment mode the HWD system defines far-field features near the aircraft, the far-field features visible from the aircraft and associated with features and other symbology that may be rendered by the HWD (and which must be aligned to the real-world three-dimensional positions of the far-field features in the navigational frame). The aircraft positioning system (e.g., GPS/IRS) determines feature pointing vectors to the identified far-field features in the navigational frame. The HWD user estimates a nominal position and orientation of the head (head pose) such that the far-field features are within the field of view of the display unit. The HWD system renders the far-field features in the display unit based on the nominal head pose and the feature pointing vectors. The rendered far-field features may then be aligned, manually or with camera assistance, to their real-world counterparts (e.g., the 3D positions of each far-field feature); when the alignment is successful or within acceptable accuracy bounds, a latched headtracker pose is determined based on the successful alignment (e.g., as well as the current alignment of the display frame to the platform frame associated with the successful alignment). Based on the latched headtracker pose, the nominal head pose, and an extrinsic calibration of the HWD display unit, the headtracker alignment (platform relative to camera frame to marker frame) is updated. Based on the updated headtracker alignment, the display alignment of the feature pointing vectors from the platform frame to the display frame may be updated so far-field features may be rendered in an alignment conformal to a real-world view of the far-field features.

In some embodiments, the display unit is manually aligned by the user, e.g., the user manually aligns rendered far-field features to their 3D positions and manually indicates a successful alignment (e.g., from which the latched headtracker pose is determined).

In some embodiments, the display imagery includes error bars for bounding the accuracy of the alignment of the far-field features to their corresponding real-world positions.

In some embodiments, the HWD system includes a witness camera oriented to view the HWD display imagery. For example, the witness camera may detect rendered far-field features at observed locations in the display imagery. The HWD system may then determine a discrepancy between the observed locations and the real-world 3D positions of each far-field feature and update the display alignment based on the discrepancy.

In some embodiments, the HWD system includes a witness camera not aligned with the display unit, but in a different camera reference frame. For example, the witness camera detects far-field features within the display imagery, and the HWD system determines a discrepancy between the detected far-field features and their corresponding feature pointing vectors in the navigational frame. The display alignment is updated based on the determined discrepancy.

In some embodiments, the optical/inertial headtracker is an inside-out headtracker wherein cameras are attached to the HWD and fiducial markers disposed throughout the aircraft within the field of view of the cameras (e.g., within a cockpit or control area).

In some embodiments, the optical/inertial headtracker is an outside-in headtracker wherein the cameras are disposed within the aircraft and the fiducial markers are attached to the head of the user (within the camera field of view).

A method for conformal alignment of a HWD display unit is also disclosed. In embodiments, the method includes defining a set of far-field features visible from an aircraft (e.g., through the HWD as worn by a pilot, crewmember or other user), where each far-field feature has a known three-dimensional (3D) position relative to a navigational reference frame (e.g., north/east/down). The method includes determining (e.g., via a GPS/IRS aircraft positioning system) feature pointing vectors to each identified far-field feature relative to an aircraft reference frame (e.g., platform frame). The method includes estimating a nominal head pose of the wearer/user for aligning a display reference frame (e.g., of the HWD display) with the platform frame, such that the nominal head pose places the identified far-field features within the field of view of the display unit. The method includes rendering, via the HWD display, the identified far-field features (e.g., as graphical elements and/or symbology) based on the nominal head pose and the feature pointing vectors to each far-field feature. The method includes aligning the rendered far-field features to their real-world counterparts (e.g., to their corresponding 3D positions). The method includes, based on a successful alignment of rendered features to real-world features/feature positions, determining a latched headtracker pose, e.g., a latched position and orientation (e.g., Oa to Oh: camera frame relative to marker frame, or marker frame relative to camera frame) of the HWD headtracker system. The method includes updating the headtracker alignment (e.g., an alignment of the headtracker relative to the platform frame) based on the latched headtracker pose, the nominal head pose, and an extrinsic calibration of the HWD display unit relative to the marker frame or camera frame (Oh). The method includes, based on the updated headtracker alignment, updating a display alignment for aligning the feature pointing vectors for far-field features to the display reference frame (e.g., so the rendered far-field features may be displayed in an alignment conformal to their real-world view).

In some embodiments, the method includes manual alignment of the rendered far-field features to their real-world 3D positions. For example, the method includes presenting, via the HWD, display imagery including the rendered far-field features and their corresponding real-world 3D positions. The method includes manually aligning (e.g., via the wearer/user) the far-field features to their real-world positions (e.g., via movement of the HWD display) and manually indicating a successful alignment (e.g., an alignment within acceptable accuracy bounds). The method includes determining the latched headtracker pose based on the headtracker pose corresponding to the successful alignment.

In some embodiments, the method includes providing error bars or like symbology via the HWD display unit to indicate accuracy bounds on the real-world positions of far-field features, e.g., to assist in manual alignment of the rendered far-field features to said real-world positions.

In some embodiments, the method includes camera-assisted alignment of the rendered far-field features to their real-world 3D positions. For example, the method includes presenting, via the HWD, display imagery including the rendered far-field features and their corresponding real-world 3D positions. The method includes capturing the HWD display imagery via a witness camera oriented with the field of view of the HWD display and having a camera reference frame. The method includes detecting (e.g., manually or with the assistance of computer vision algorithms) the rendered far-field features at relative locations within the display imagery (e.g., at observed locations relative to the camera frame). The method includes determining discrepancies between the observed locations of the rendered far-field features (e.g., as the HWD wearer/user would see them) and their real-world 3D positions. The method includes updating the display alignment based on the determined discrepancies.

In some embodiments, the method includes camera-assisted alignment of rendered far-field features to their real-world 3D positions via a witness camera not oriented with the HWD display field of view. For example, the method includes capturing display imagery via a witness camera defined by an extrinsic calibration relative to the display frame but not directly oriented in the display field of view. The method includes detecting the real-world far-field features (e.g., in their real-world 3D positions) within the display imagery. The method includes determining discrepancies between the 3D positions of each far-field feature and their corresponding feature pointing vectors relative to the display frame. The method includes updating the display alignment based on the determined discrepancies.

In some embodiments, the optical-inertial headtracker is in an inside-out configuration. For example, the inside-out headtracker includes a camera mounted to the HWD unit (or, e.g., to the head of the wearer/user) and fiducial markers fixed throughout the aircraft cockpit within the camera field of view. The inside-out headtracker determines a headtracker pose of the camera reference frame relative to the marker reference frame.

In some embodiments, the optical-inertial headtracker is in an outside-in configuration. For example, the outside-in headtracker includes a camera mounted in the aircraft cockpit and oriented at the HWD wearer/user, and fiducial markers fixed to the user's head within the camera field of view. The inside-out headtracker determines a headtracker pose of the marker reference frame relative to the camera reference frame.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
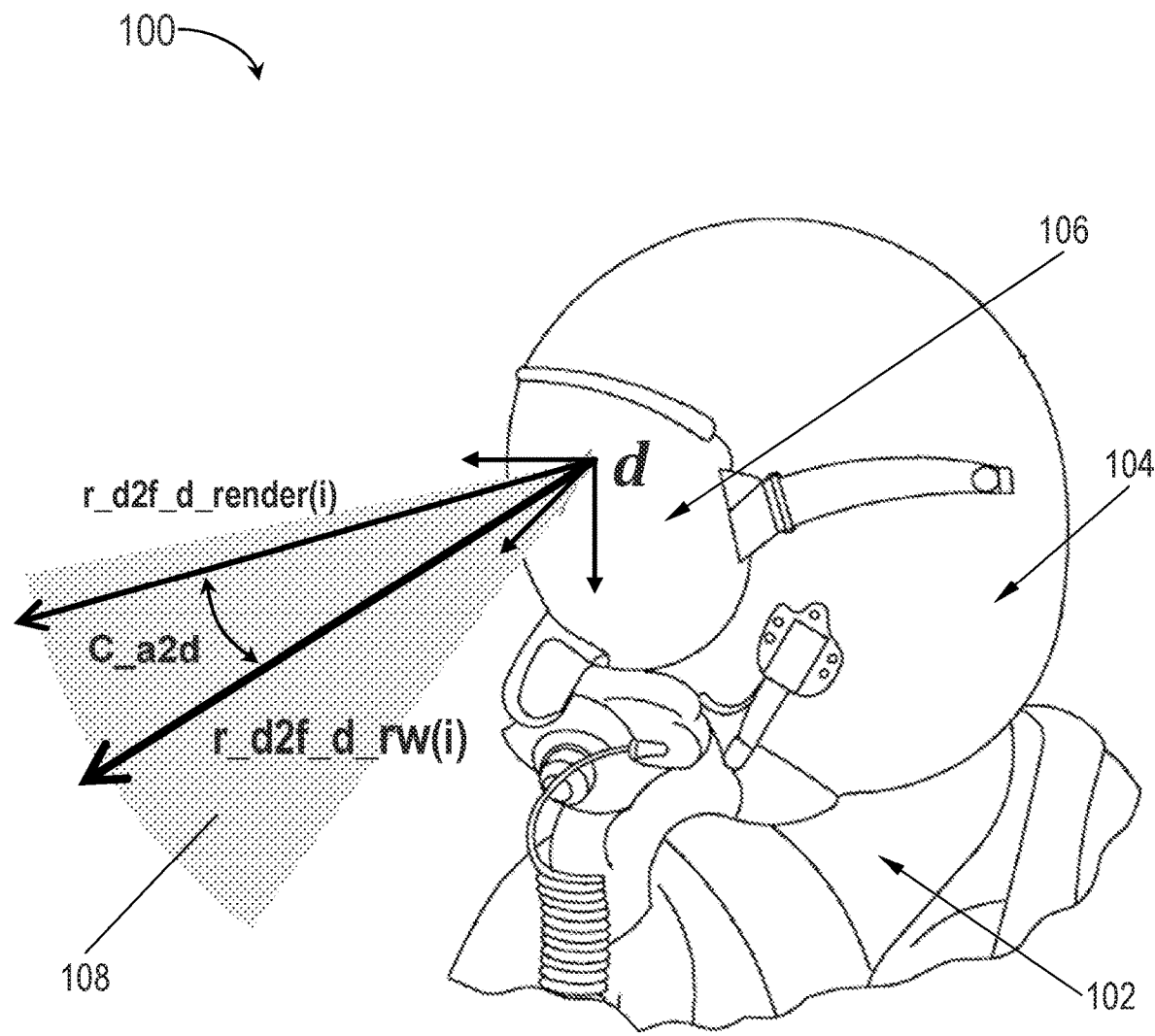
FIG. 1 is an illustration of a head worn display (HWD) system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for conformal alignment of a headtracker for a head worn display (HWD) system. For example, conformal installation alignment of an HWD (e.g., worn by an aircraft pilot) to the aircraft platform ensures that any flight-critical guidance cues, symbology, or other visual intelligence rendered by the HWD conform to a real-world view. Establishing, and maintaining, conformal alignment of the headtracker within allowable tolerances prevents the HWD system from presenting hazardously misleading information (HMI) which may endanger the pilot, the aircraft, crew and passengers, and/or others. Continued evaluation of conformal headtracker alignment prevents conformality error from accumulating in the HWD kinematics chain and provides real time monitoring of safety-critical functions.

FIG. 1—HWD System

Referring to FIG. 1, a head worn display (HWD) system is disclosed.

In embodiments, the HWD system 100 may include helmet-mounted displays (HMD) or display systems otherwise worn by a user 102 or, e.g., attached to a helmet 104 or some other article worn by the user. For example, the HWD system 100 may include a display unit 106, e.g., a visor, eyepiece, or other like surface capable of presenting imagery, symbology, and/or other like visual intelligence to the user 102, the visual intelligence projected thereonto via one or more emitters or projectors. The HWD system 100 may be physically attached to the user 102, e.g., rigidly or adjustably via one or more gimbals, such that the display unit 106 may move with the user and remain fixed within the field of view (FOV) of the user. In embodiments, the HWD system 100 may be associated with a display reference frame d (e.g., display frame, d-frame). For example, as the user 102 moves their head (e.g., translation, rotation) the pose (relative position and orientation) of the HWD system 100 may change in the display frame d, e.g., relative to a default position and orientation.

In embodiments, the display unit 106 may render flight-critical guidance cues, symbology, and/or other visual features. For example, the display unit 106 may provide a real-time image stream and superimpose rendered graphical features at significant locations within the display unit FOV, e.g., to provide guidance cues relevant to specific environmental features, proximate aircraft, and/or threats. In embodiments, for these rendered graphical features not to constitute hazardously misleading information (HMI), the alignment of the headtracker of the HWD system 100 must sufficiently conform to the real-world view of real-world objects corresponding to the rendered features. For example, each graphical far-field feature rendered by the HWD system 100 may have a relative three-dimensional (3D) position r_d2f_d_render(i) corresponding to a relative position of the rendered feature in the FOV of the display unit 106. Similarly, each rendered graphical far-field feature may have a real-world 3D position r_d2f_d_rw(i) corresponding to the real-world position of the far-field feature, or where it should appear within the FOV of the display unit 106. Further, in embodiments, each rendered far-field feature may be associated with a particular conformality range 108 indicating the precision with which the relative rendered position of the far-field feature must conform with its real-world position. If, for example, the relative rendered position r_d2f_d_render(i) is outside the corresponding conformality range 108 of the corresponding real-world 3D position r_d2f_d_rw(i), the rendered far-field feature may be unacceptably misaligned and may constitute HMI. In embodiments, by adjusting the rotational orientation C_a2d (e.g., display alignment) of the display frame d relative to the aircraft reference frame a (otherwise known as, e.g., the body frame b or platform frame p), the HWD system 100 may be conformally aligned in the reference frame of the aircraft such that far-field features rendered by the HWD system are rendered consistently with their real-world positions. For example, the HWD system 100 may be conformally aligned to the aircraft frame at installation, or the HWD system 100 may be periodically assessed to ensure the alignment remains conformal with sufficient accuracy (and realigned if necessary).

Figure 2:
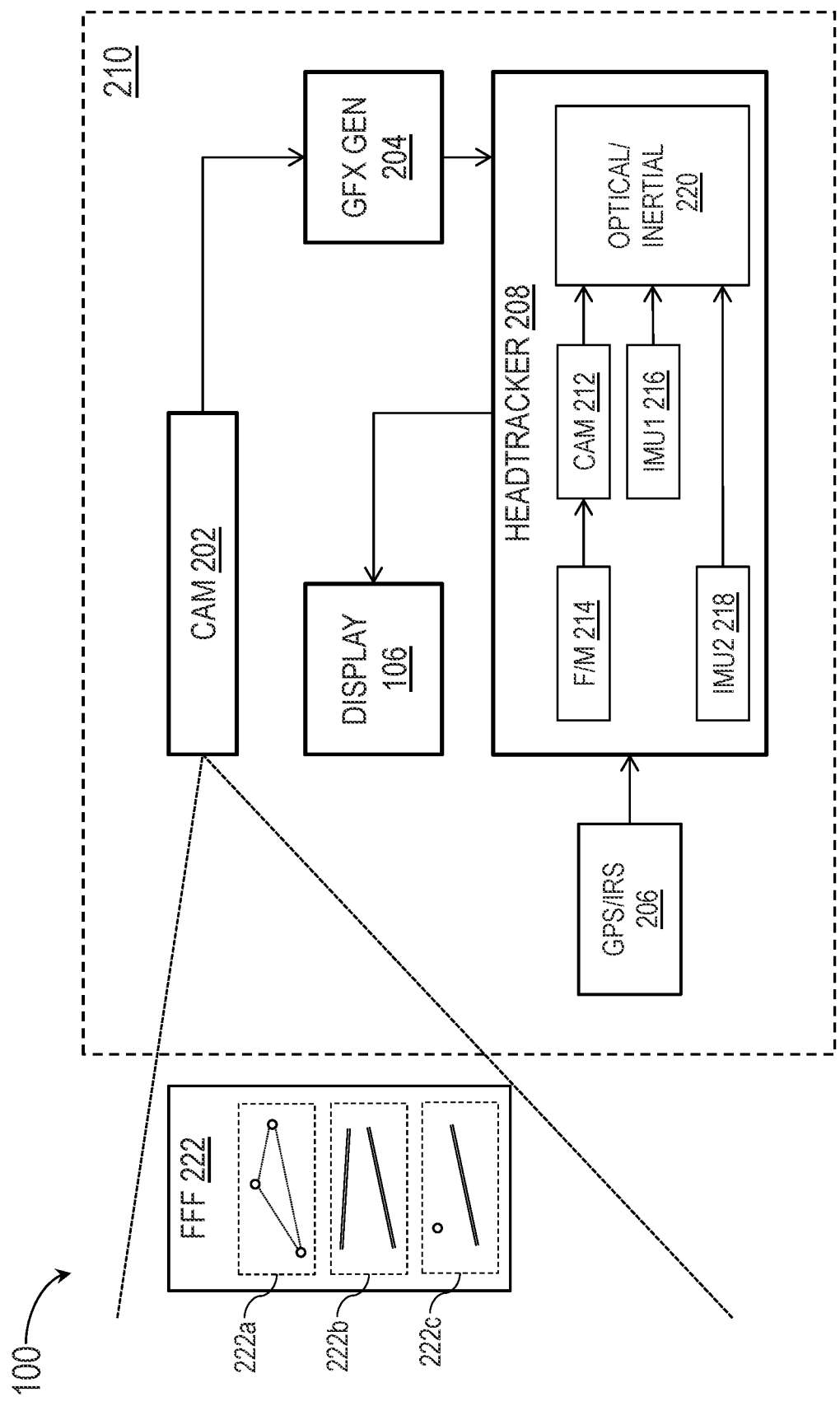
FIG. 2 is a block diagram of the HWD system of FIG. 1.

FIG. 2—System Components

Referring now to FIG. 2, the HWD system 100 is shown. The HWD system 100 may include camera 202, graphics generation processors 204, aircraft positioning system 206 (e.g., global positioning system/inertial reference system (GPS/IRS)), and headtracker 208.

In embodiments, the HWD system 100 may present to the user (102, FIG. 1) images captured by a camera 202 attached to an aircraft 210 of which the user is a pilot, crewmember, or passenger. For example, the camera 202 may be externally attached to the aircraft 210 (e.g., relative to the aircraft reference frame a), or attached to a helmet worn by the user 102 (e.g., relative to a head reference frame h). Images captured by the camera 202 may be enhanced by symbology or other graphical elements provided by the graphics generation processors 204 (e.g., enhanced vision systems (EVS), synthetic vision systems (SVS)). For example, the display unit 106 of the HWD system 100 may provide the user 102 with images captured by the camera 202 and representing a field of view generally forward of the aircraft 210. Symbology provided by the graphics generation processors 204 (e.g., SVS elements) may provide additional context relevant to the displayed imagery, e.g., navigational information, terrain information, targeting and/or threat information, weather information. In some embodiments, the HWD may be an augmented reality (AR) based display system wherein the HWD presents a real-world view, on which additional symbology may be overlaid, via the display unit 106.

In embodiments, the headtracker 208 monitors a position and orientation of the head of the user ("head pose") by continually calculating a transformation (e.g., in six degrees of freedom (6DoF)) between a first optical reference frame Oh relative to a second optical reference frame Oa. For example, the headtracker 208 may include a camera 212 or other optical tracker and a set of fiducial markers 214, the camera configured for capturing imagery portraying the fiducial markers in detectable locations relative to a camera frame c (e.g., image frame). By comparing these relative locations to three-dimensional known positions of the fiducial markers (e.g., relative to a marker reference frame m), along with relative pose data in the head and aircraft frames provided by head-frame and aircraft-frame inertial measurement units 216, 218 (IMU), the optical-inertial headtracker 220 may provide the display unit 106 with current and accurate head pose data such that the imagery and symbology provided by the display unit accurately represents what the user 102 is looking at for any given time of validity.

In some embodiments, the headtracker 208 may be an inside-out system wherein the camera 212 is mounted to the head of the user 102 and the fiducial markers 214 in fixed locations around a cockpit or control area of the aircraft 210. For example, in the inside-out configuration optical reference frame Oa may correspond or relate to the marker frame m and the optical reference frame Oh to the camera frame a. Alternatively, the headtracker 208 may be an outside-in system wherein one or more cameras 212 are fixed around the cockpit and the fiducial markers 214 attached to the head of the user 102 within the field of view of one or more cameras. In the outside-in configuration, for example, the optical reference frames Oa, Oh may respectively correspond or relate to the camera frame c and the marker frame m.

In some embodiments, the headtracker 208 may receive additional georeferenced high-integrity positioning information from the GPS/IRS 206 (in a navigational reference frame n, e.g., north-east-down), providing georeferenced head pose data and allowing the display unit 106 to provide georeferenced symbology in an earth-centered earth-referenced (ECEF) frame e. In some embodiments, the headtracker 208 is a magnetic field headtracker wherein the cameras 212 and fiducial markers 214 are replaced by a magnetometer capable of detecting a well-known magnetic field source, which detection provides an alternative basis for determining the transformation between the Oh and Oa reference frames.

In embodiments, images captured by the camera 202, as well as symbology generated by the graphics generation processors 204, may reference far-field features 222. For example, far-field features 222 may correspond to runways or runway elements proximate to the aircraft but at sufficient distance to remain in a relatively consistent location as seen by the user 102; for example, such that the viewing angle from the HWD user/wearer is not significantly affected by head positioning errors, e.g., errors associated with the estimated nominal head pose r_a2d_a. While the display unit 106 may present said far-field features 222 in captured imagery, the graphics generation processors 204 may likewise generate symbology corresponding to these features.

Figure 3A:
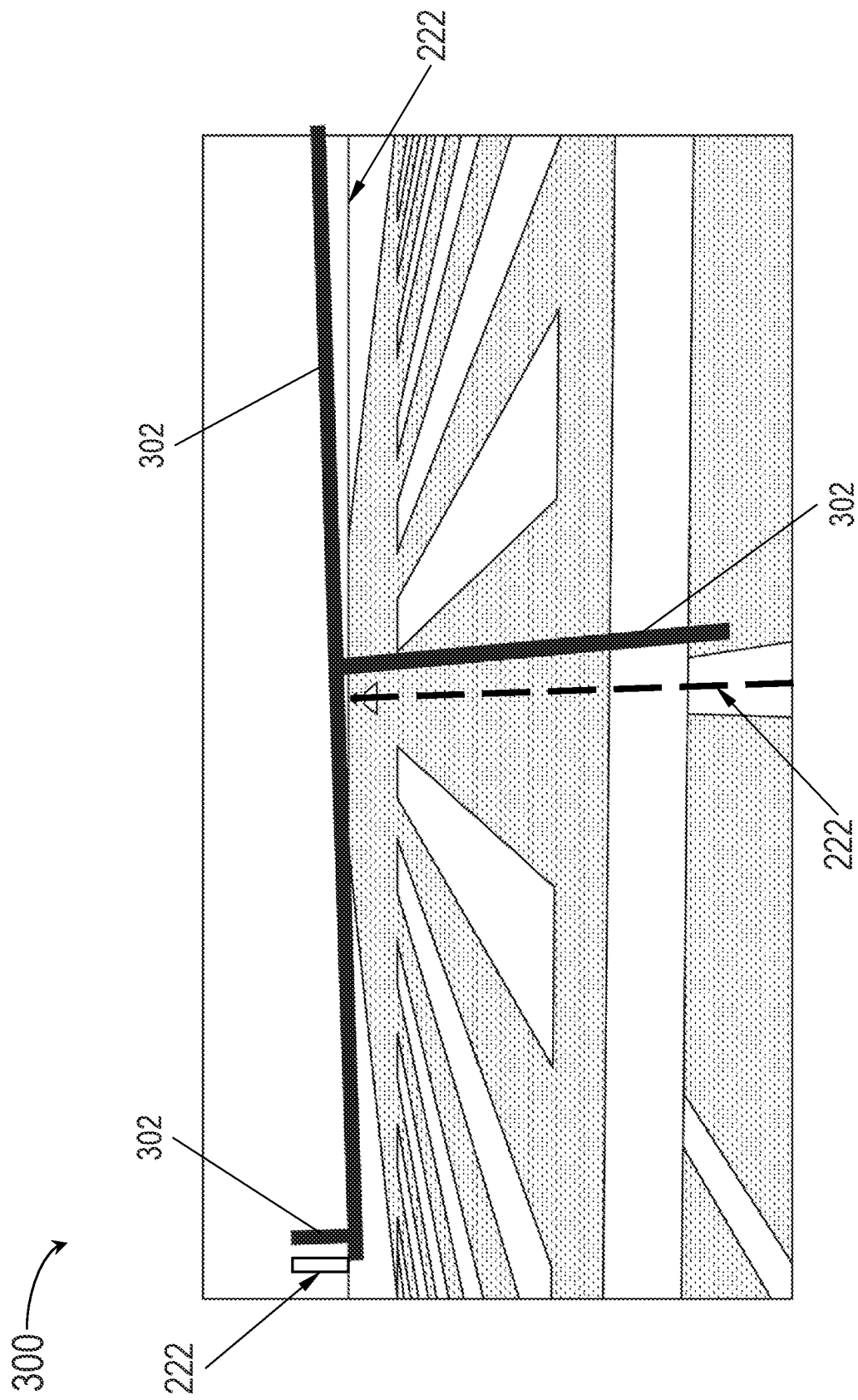
FIGS. 3A and 3B respectively illustrate a misaligned, and properly aligned, HWD system according to example embodiments of this disclosure.
Figure 3B:
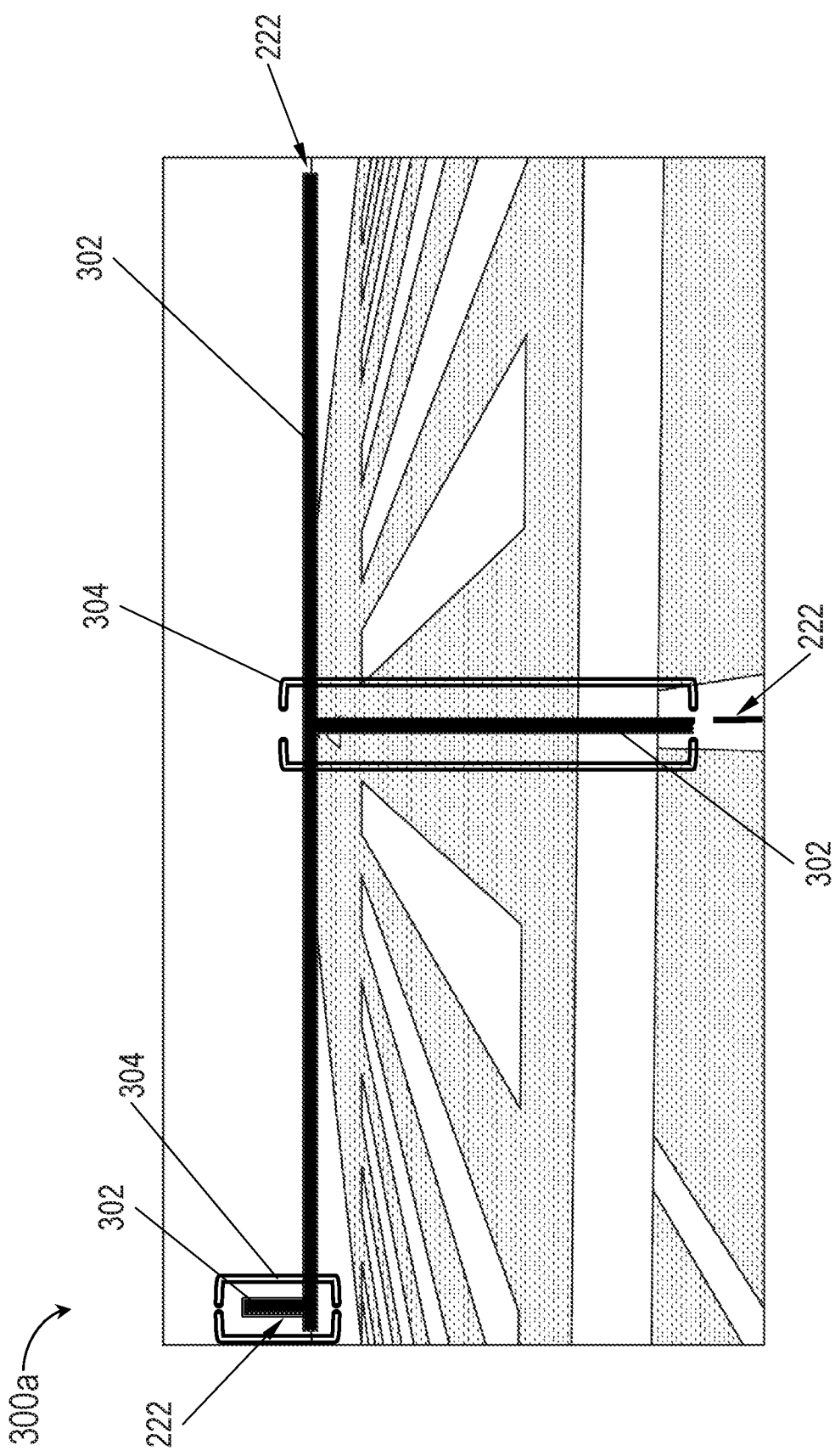

FIGS. 3A and 3B—Misalignment and Conformal Alignment

In embodiments, the HWD system 100 may be conformally aligned to the aircraft reference frame a of the aircraft 210 by aligning symbology and/or graphical elements corresponding to far-field features 222 (e.g., and superimposed or otherwise added to the image display provided by the display unit 106) to the real-world positions of the far-field features. For example, far-field features 222 may correspond to one or more of: a set of three non-collinear points 222a; a set of two non-parallel lines 222b; or a line and a point not on the line 222c.

Referring also to FIG. 3A, an image 300 provided by the display unit (106, FIG. 1) may portray a far-field feature 222 (e.g., a runway centerline, horizon, and tower) and symbology 302 corresponding to the far-field feature. If, for example, the HWD system 100 is not conformally aligned to the aircraft frame a with sufficient accuracy, the symbology 302 will not align with its corresponding far-field feature 222 and may potentially constitute HMI. Referring also to FIG. 3B, the image 300a may be implemented similarly to the image 300 except that the image 300a may reflect a successful alignment of the HWD system 100 to the aircraft frame a. Accordingly, the image 300a may align the symbology 302 and its corresponding far-field features 222 with sufficient accuracy.

In some embodiments, the HWD system 100 may present error bars 304 or other like error symbology as guidance for a manual or camera-assisted alignment of symbology 302 or other rendered far-field features to the corresponding real-world three-dimensional positions of said far-field features 222. For example, error bars 304 may bound the alignment of the rendered far-field features to a required or desired degree of accuracy.

Figure 4:
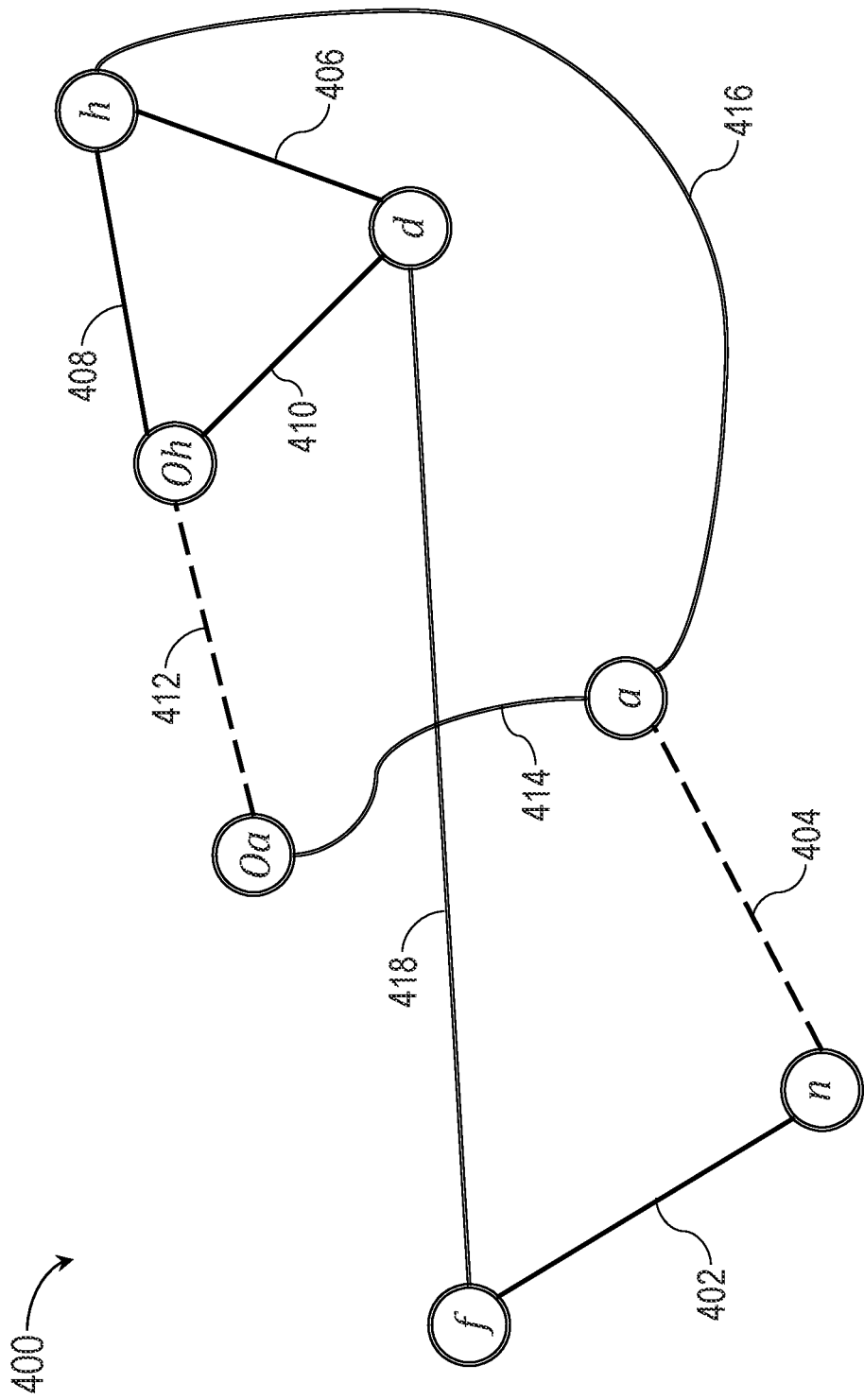
FIG. 4 is a relationship diagram of reference frames relevant to the HWD system of FIG. 1 and to an aircraft within which the HWD system may be embodied.

FIG. 4—Reference Frame Relationships

Referring now to FIG. 4, the relationship 400 includes kinematic chains involved in the capturing of images, generation of symbology, and conformal display of enhanced images by the HWD system 100.

For example, the navigational reference frame n may refer to a reference north-east-down (NED) frame, as noted above. Georeferenced feature points f may include far-field features (222, FIG. 2) or components thereof having a known three-dimensional (3D) position (e.g., coordinates) defined in the navigational frame n, and thus a fixed relationship 402 (corresponding to a solid line) may exist between the reference frames f n. As the aircraft (210, FIG. 2) moves relative to the far-field features 222 (and relative to the navigational frame n), a time-varying relationship 404

(corresponding to a broken line) may exist between the aircraft frame a and navigational frame n.

A separate kinematic chain may include the display frame d, head frame h, and optical reference frames Oh, Oa. For example, the display unit (106, FIG. 1) may be worn on the head of the user (102, FIG. 1) and thus fixed thereto, such that the display frame d may be equivalent to the head frame h or associate with the head frame according to a fixed transformation and a fixed relationship 406. Similarly, when the HWD system 100 is in an inside-out configuration wherein the headtracker camera (212, FIG. 2) is also worn on the head of the user 102 and defined relative to the head and display frames h, d by an extrinsic calibration, the optical reference frame Oh may also fixedly relate 408, 410 to the head frame h and display frame d respectively. Movement of the headtracker camera 212 relative to the fiducial markers (214, FIG. 2) is reflected in the time-varying relationship 412 between the optical reference frames Oh, Oa.

In embodiments, conformal alignment of the HWD system 100 to the aircraft frame a involves connecting these two kinematic chains (or chain fragments) via a relative position/orientation relationship, e.g., determining a position and orientation of georeferenced far-field features f (222) relative to the display frame d, such that the far-field features (e.g., or symbology corresponding thereto) may be rendered conformally. For example, an A2Oa relationship 414 may be established via a set of three or more fiducial markers disposed within the aircraft 210 at known positions in the aircraft frame a, thereby connecting the aircraft frame a with the optical reference frame Oa (e.g., marker frame m, for an inside-out headtracker 208). Alternatively, an A2H relationship 416 may compare attitude measurements of the IMU (216/218, FIG. 2) of the HWD system 100 with those of the GPS/IRS (206, FIG. 2), aligning the head frame h to the aircraft frame a (and, e.g., reinforcing the alignment estimation by varying the head pose under testing).

In embodiments, the HWD system 100 may alternatively connect the kinematic chains based on a D2F relationship 418 wherein far-field features 222 rendered by the HWD system 100 in the display frame d are aligned to the real-world positions f of said far-field features, e.g., in the navigational frame n.

FIG. 5—Normal Mode

Figure 5:
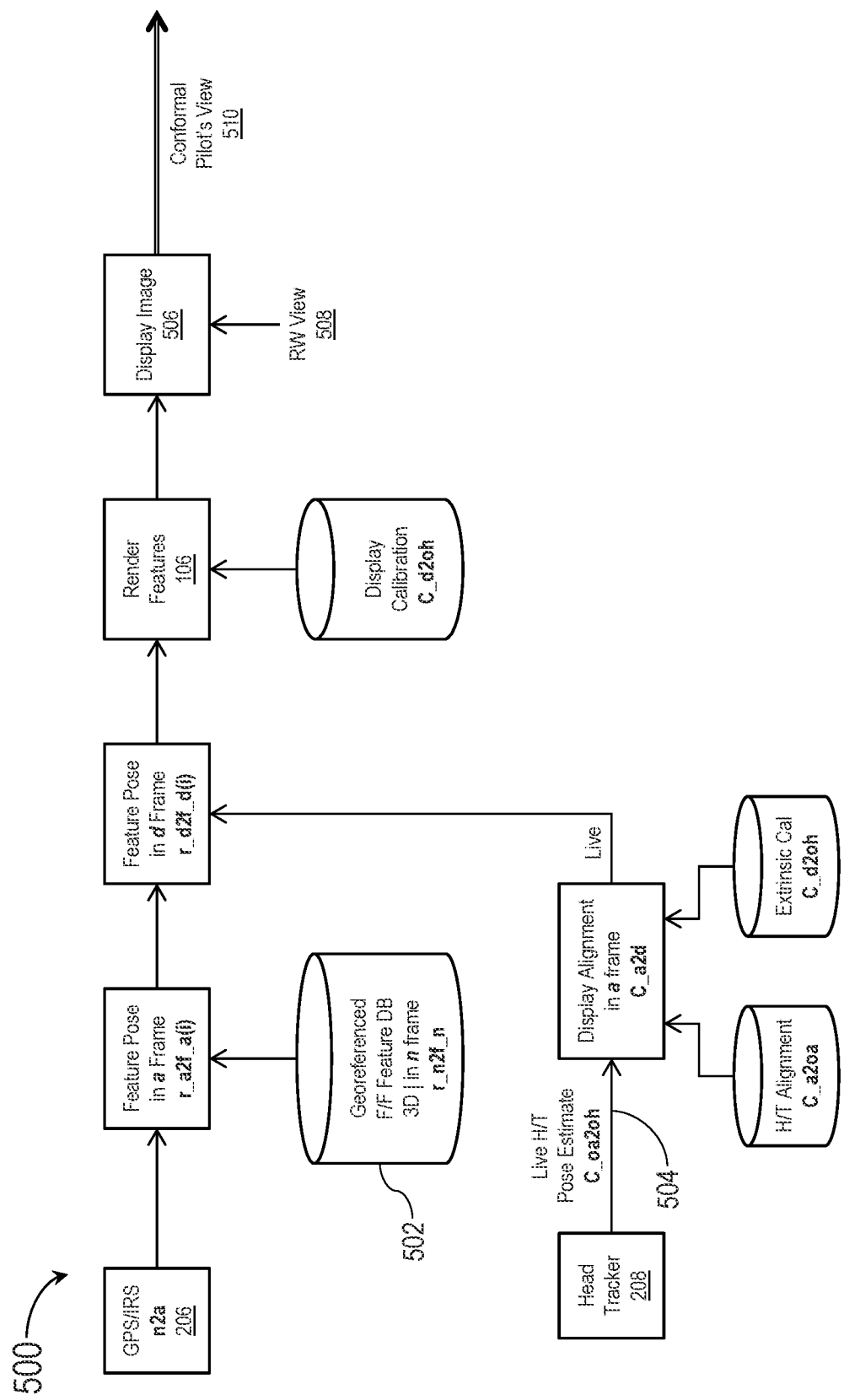
FIG. 5 is a diagrammatic illustration of the HWD system of FIG. 1 in normal operating mode according to example embodiments of this disclosure.

Referring now to FIG. 5, the HWD system (100, FIG. 1) is shown in a normal operating mode 500.

In embodiments, the GPS/IRS 206 may provide the HWD system 100 with absolute and relative position data of the aircraft (210, FIG. 2) relative to the navigational frame n. For example, absolute position data may include a GPS- or GNSS-driven position of the aircraft 210, while relative position data may include relative translations and/or rotations of the aircraft relative to an absolute position. In embodiments, the HWD system 100 may identify candidate far-field features 222, e.g., those far-field features likely to be portrayed in images captured by forward-facing cameras 202, 212 of the aircraft 210 and/or HWD system. For example, georeferenced feature databases 502 stored or accessed by the HWD system 100 may include an index of far-field features 222 along with known 3D positions r_n2f n for each far-field feature in the navigational frame n. In embodiments, the HWD system 100 may compute feature pointing vectors r_a2f_a(i) (e.g., feature poses) to each candidate far-field feature 222 in the aircraft frame a, e.g., based on the known 3D n-frame positions of each feature and the current position of the aircraft 210.

In embodiments, based on the feature pointing vectors r_a2f_a(i) of candidate far-field features 222 in the aircraft frame a, the HWD system 100 may compute display pointing vectors r_d2f_d(i), or display poses, to each far-field feature in the display frame d. For example, the HWD system 100 may receive frequent live updates of the headtracker pose estimate C_oa2oh, or the estimated 6DoF pose of the optical reference frame Oh of the HWD system relative to the optical reference frame Oa. In embodiments, based on the headtracker pose update C_oa2oh, as well as the extrinsic calibration C_d2oh of the display unit 106 relative to the Oh frame and the current alignment C_a2oa of the headtracker 208 relative to the aircraft frame a, the HWD system 100 may update the alignment C_a2d of the display unit 106 in the aircraft frame.

In embodiments, based on the display pointing vectors r_d2f_d(i) of candidate far-field features 222 in the display frame d and the extrinsic calibration C_d2oh of the display unit 106, the HWD system 100 may render the candidate far-field features via the display unit. For example, the image 505 presented to the user 102 by the display unit 106 may include rendered far-field features 222 (e.g., symbology generated by the graphics generation processors (204, FIG. 2) in the display frame d) as well as the actual far-field features (e.g., a real-world view 508 of the far-field features).

In embodiments, the HWD system 100 may be configured for one or more alignment modes for resolving the displayed image 506 and rendered far-field features 222 with the real-world view 508 of said features, updating the display alignment C_a2d such that the display unit 106 presents to the user 102 a conformal pilot's view 510 wherein rendered and actual far-field features are conformally aligned with sufficient accuracy.

Figure 6:
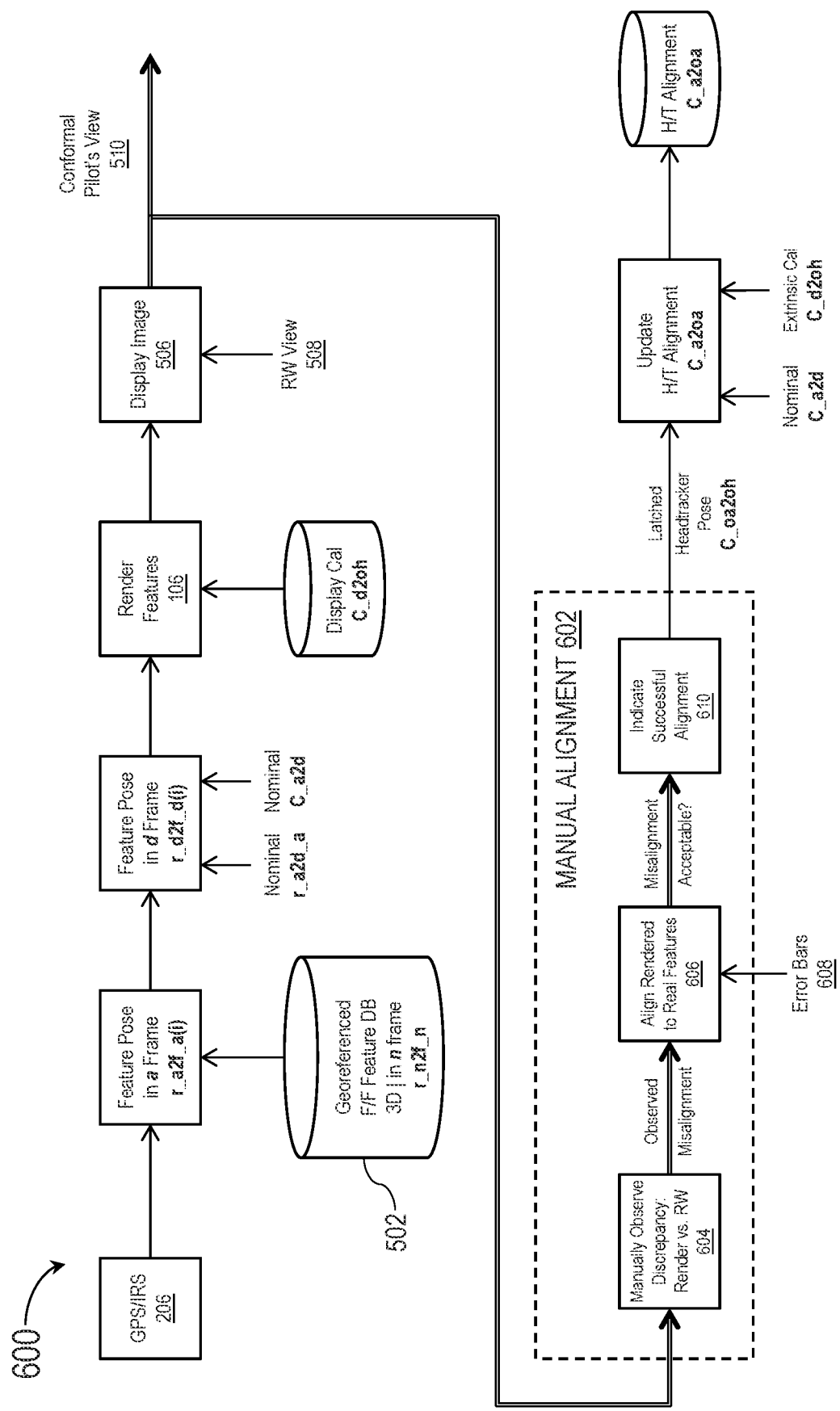
FIG. 6 is a diagrammatic illustration of the HWD system of FIG. 1 in a manual alignment mode for aligning a headtracker of the HWD system according to example embodiments of this disclosure.

FIG. 6—Alignment Mode (Manual)

Referring now to FIG. 6, the HWD system 100 may be transitioned from the normal operating mode 500 of FIG. 5 to an external feature alignment mode 600 for conformal alignment (510) of the displayed image 506 and rendered far-field features 222 with the real-world view 508 of said far-field features.

In embodiments, as noted above with respect to FIG. 5, a set of candidate far-field features (222, FIG. 2) may be determined, such that the HWD wearer/user (102, FIG. 1) should be able to see said features in front of the aircraft (210, FIG. 2). Further, a feature pointing vector r_a2f_a(i) in the aircraft frame a may be determined for each candidate far-field feature 222. In embodiments, a display pointing vector r_d2f_d(i) may be determined for each candidate far-field feature 222 in the display frame d, based on a nominal head pose r_a2d_a, C_a2d in the aircraft frame. For example, the display alignment C_a2d_render of the display unit 106 in the aircraft frame should ensure that the candidate far-field features 222 are within the frustum of the display unit 106 and may therefore be rendered. In embodiments, the location of rendered far-field features may be determined by:

$$r\_d2f\_d\_render(i) = C\_a2d\_render * r\_d2f\_a(i)$$
$$= C\_a2d\_render * (r\_a2f\_a(i) - r\_a2d\_a)$$
$$pixelsRendered(i) = displayProjectionModel\ (r\_d2f\_d\_render(i))$$

In embodiments, the external feature alignment mode 600 may be a manual alignment mode 602 wherein the user 102 may manually align the rendered far-field features 222 of the displayed image 506 to the real-world view 508 of said features. For example, the user 102 may, via the display unit 106, manually observe (604) the discrepancy (e.g., misalignment) between the rendered far-field features 222 of the displayed image 506 and the corresponding real-world view 508. In embodiments, the user 102 may physically move their head (606) to adjust the display unit 106 and thereby align the rendered far-field features 222 of the displayed image 506 to their real-world view 508 (e.g., to their 3D positions). For example, the HWD system 100 may display (via the display unit 106) error bars 608 or like symbology indicating or bounding the desired level of accuracy, or otherwise providing guidance for the alignment of rendered far-field features 222 to the real-world view 508.

In embodiments, when the user 102 has achieved a successful alignment (e.g., within acceptable accuracy bounds) of the rendered far-field features 222 of the displayed image 506 to the real-world view 508 (e.g., resulting in a conformally aligned pilot's view 510), the user may manually indicate (610) the successful alignment to the HWD system 100, e.g., via a button, switch, or other interaction. For example, upon receipt of the indication of the successful alignment, the HWD system 100 may compute a latched headtracker pose C_oa2oh_latched based on the current alignment of the display unit 106 to the aircraft frame a (e.g., corresponding to the successful alignment). In embodiments, the latched headtracker pose C_oa2oh_latched may be used to update the headtracker alignment C_a2oa of the headtracker (208, FIG. 2), e.g., based on the nominal alignment C_a2d_render of the display unit 106 in the aircraft frame and the extrinsic calibration C_d2oh of the display unit in the optical reference frame Oh. Further, based on the updated headtracker alignment C_a2oa, in addition to live headtracker pose estimates C_oa2oh and the extrinsic calibration C_d2oh of the display unit, the display alignment C_a2d of the display unit 106 in the aircraft (platform) frame may likewise be updated such that rendered features are displayed in a sufficiently conformal alignment.

Figure 7:
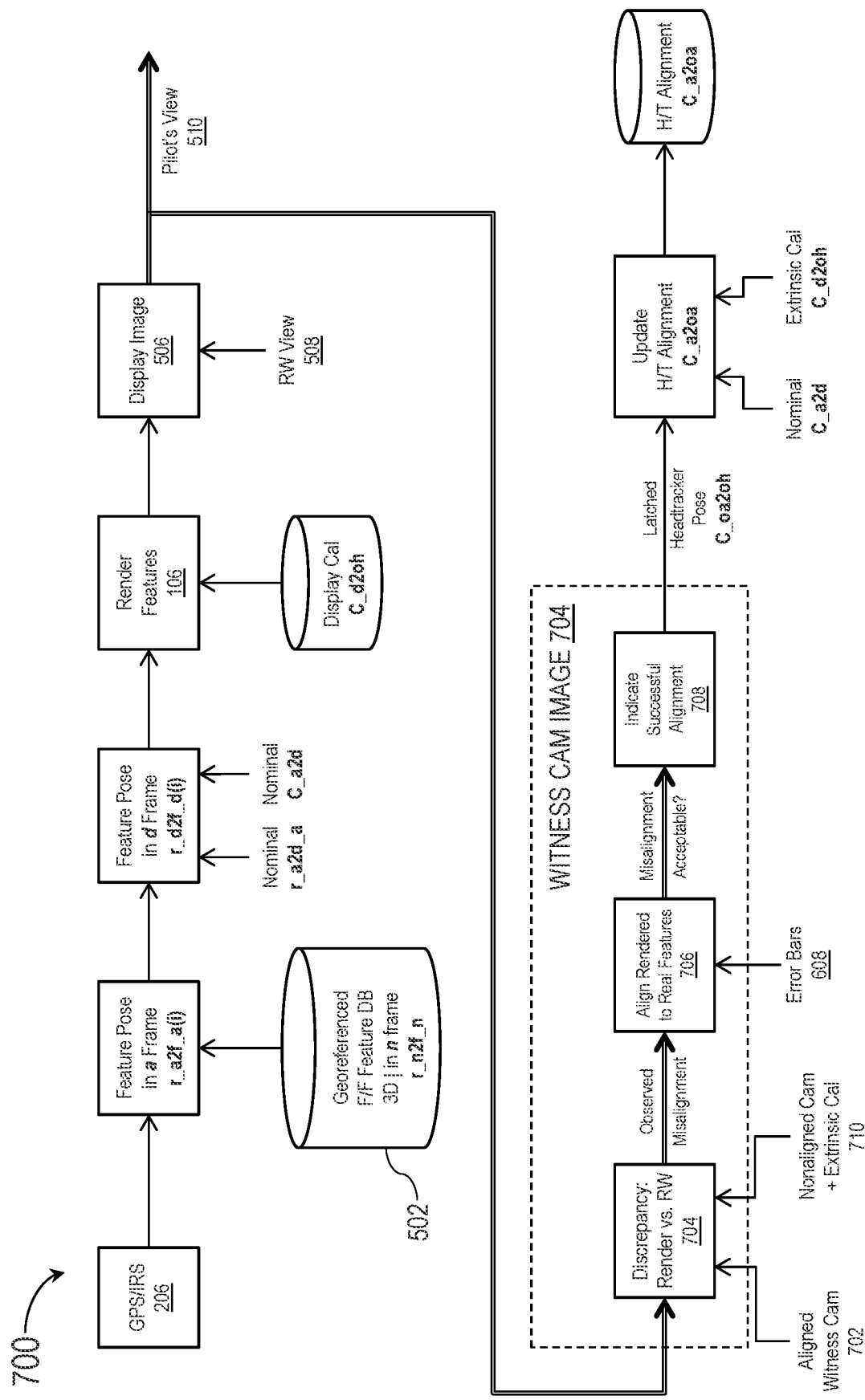
FIG. 7 is a diagrammatic illustration of the HWD system of FIG. 1 in an auto-alignment or camera-assisted alignment mode for aligning a headtracker of the HWD system according to example embodiments of this disclosure.

FIG. 7—Alignment Mode (Witness Cam)

Referring now to FIG. 7, in some embodiments the HWD system 100 may be transitioned from the normal operating mode 500 of FIG. 5 to an external feature alignment mode 700 that differs from the external alignment mode 600 in the use of a witness camera 702.

In embodiments, the witness camera 702 may be positioned proximate to the display unit 106 and in its field of view, e.g., in place of the user 102 and configured to capture the displayed image 506 as seen by the user 102. For example, the witness camera 702 may observe (704) the discrepancy between the rendered far-field features (222, FIG. 2) in the displayed image 506 and the corresponding real-world view 508 of the far-field features (e.g., corresponding to discrepancy, or misalignment, of the display alignment C_a2d of the display unit 106 in the aircraft frame a). In embodiments, a human observer may detect rendered and real-world far-field features 222 in the imagery 704 captured by the witness camera 702. In other embodiments, computer vision algorithms may label the 3D truth positions of far-field features 222 (e.g., as provided for by the geo-referenced feature database 502) and/or rendered far-field features in the imagery 704. For example, the witness camera 702 may additionally zoom into the imagery 704 so that rendered and real-world far-field features 222 (e.g., and discrepancies therebetween) may be detected in more precise detail.

In some embodiments, based on the imagery 704 captured by the witness camera 702, discrepancies between the rendered far-field features 222 in the witness camera image and the real-world 3D truth positions (508, 502) of said far-field features may be determined and the display unit 106 aligned (706) to where said discrepancies are within allowable accuracy bounds. For example, the HWD system 100 may provide error symbology 608 to aid in alignment of the display unit 106, whether performed by a human observer or via witness camera and/or computer vision algorithms. In embodiments, the human or computer vision observer may indicate (708) a successful alignment, in response to which the HWD system 100 may determine a latched headtracker pose C_oa2oh_latched and update the headtracker alignment C_a2oa and display alignment C_a2d as described above.

In some embodiments, the witness camera may be a nonaligned camera 710, e.g., a camera not aligned with the field of view of the HWD display unit 106 as described above. For example, the nonaligned camera 710 may not be oriented at the display unit 106 but may be defined by a trusted extrinsic calibration and mounted elsewhere, e.g., externally to the front of the aircraft 210 or to the HWD system 100 other than in alignment with the HWD display unit (where the far-field features 222 are still within the field of view of the nonaligned camera). In embodiments, given the trusted extrinsic calibration of the nonaligned camera 710, the HWD system 100 may assess alignment of the display unit 106 based on the extrinsic calibration and the display poses r_d2f_d(i) (e.g., pointing vectors) of each far-field feature location in the display frame d. It may be noted that, unlike the witness camera 702, the nonaligned camera 710 may "see" the real-world 3D positions of far-field features 222 (e.g., in that said far-field features will be included in imagery captured by the nonaligned camera), but may not "see" the rendered far-field features (as the nonaligned camera is not aligned with the display unit 706 and no rendered features are included in the captured imagery). Accordingly, the nonaligned camera may not directly observe the conformality of the displayed imagery 506 (and its component rendered far-field features 222) provided by the display unit 106 to the real-world view 508.

Figure 8A:
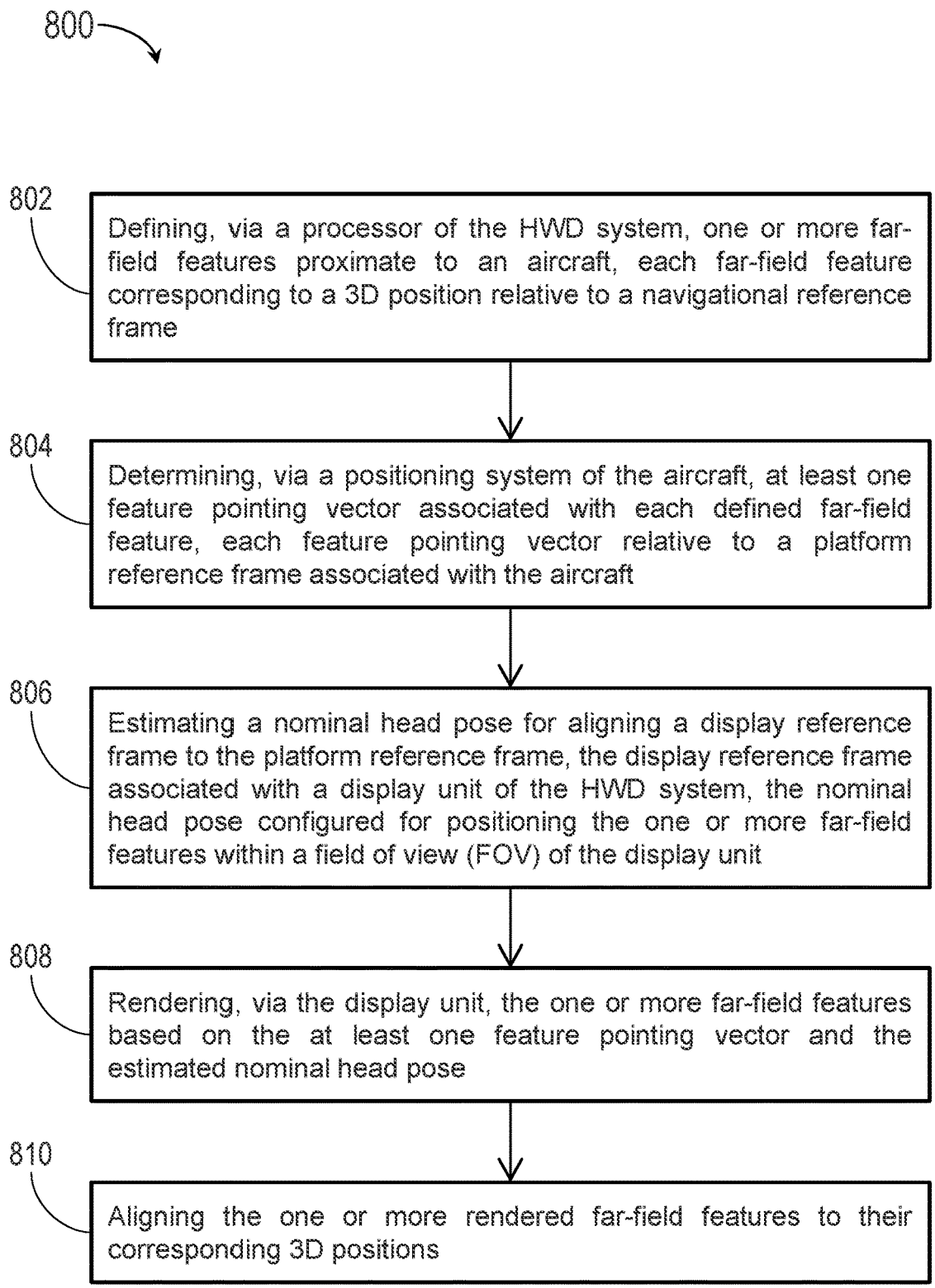
FIGS. 8A and 8B are process flow diagrams illustrating a method for conformal alignment of a headtracker for an HWD system according to example embodiments of this disclosure.
Figure 8B:
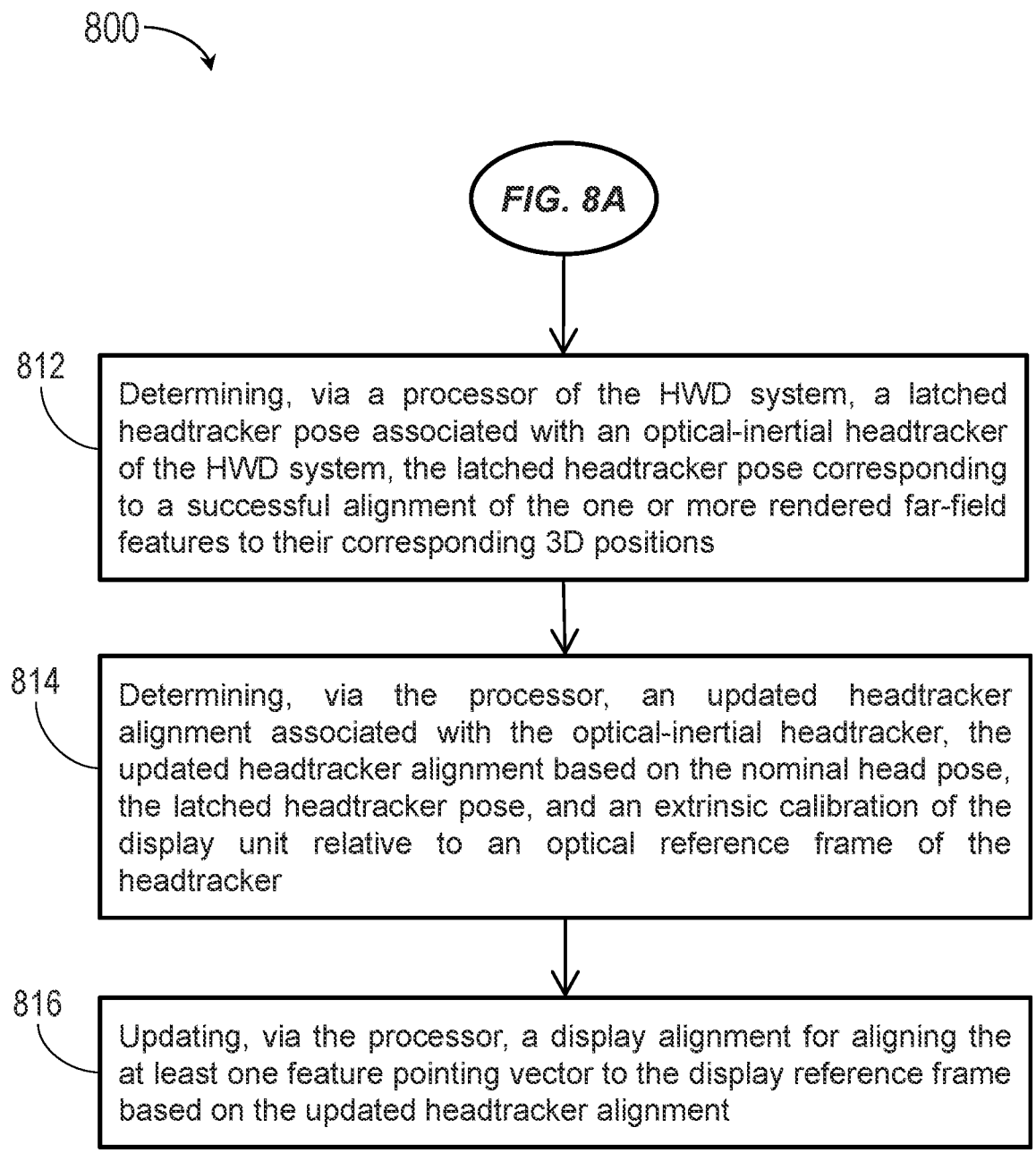

FIGS. 8A-B—Method

Referring now to FIG. 8A, the method 800 may be implemented by the HWD system 100 and may include the following steps.

At a step 802, a set of far-field features are defined proximate to an aircraft but visible therefrom (in particular, visible by an HWD user aboard the aircraft). For example, each far-field feature has a defined three-dimensional (3D) real-world truth position in a navigational reference frame (e.g., north/east/down).

At a step 804, an aircraft GPS/IRS (absolute/relative positioning system) defines feature pointing vectors to each identified far-field feature in the platform (aircraft) reference frame.

At a step 806, the HWD user/wearer estimates a nominal head pose for aligning the display reference frame (e.g., of the HWD display) to the platform reference frame. For example, the nominal head pose will orient the HWD display unit such that the identified far-field features are within the display unit field of view (FOV).

At a step 808, the HWD display unit renders the far-field features for the wearer/user based on the estimated nominal head pose and the feature pointing vectors to each far-field feature.

At a step 810, the rendered far-field features are aligned to their real-world counterparts (e.g., to the 3D truth position of each far-field features). For example, the HWD wearer/user may manually align the rendered features to their real-world counterparts via manual orientation of the HWD display, manually indicating a successful alignment within acceptable accuracy bounds. In some embodiments, the alignment may be performed with the assistance of witness cameras. For example, the witness camera may be aligned with the HWD display unit (e.g., to view the HWD display as the user would); rendered and real-world far-field features are detected (e.g., manually or with computer-vision assistance) and discrepancies between the rendered and real-world far-field features determined. Alternatively, in some embodiments the witness camera is not aligned with the HWD (although forward-oriented) but captures imagery within which the real-world far-field features are detected and their relative locations within the imagery compared with the feature pointing vectors to each far-field feature in the platform reference frame (e.g., allowing for the extrinsic calibration of the witness camera in the aircraft frame) and discrepancies determined between the witness camera imagery and the feature pointing vectors.

Referring also to FIG. 8B, at a step 812 the HWD system determines a latched headtracker pose C_oh2oa_latched corresponding to a successful alignment of rendered far-field features to real-world 3D truth positions of said far-field features as described above. For example, a successful alignment within accuracy bounds may be manually or automatically indicated, e.g., based on how the alignment is executed.

At a step 814, the HWD system updates a headtracker alignment C_a2oa of the HWD optical/inertial (e.g., magnetic/inertial) headtracker system based on the estimated nominal head pose r_a2d_a, the latched headtracker pose C_oh2oa (e.g., live estimates), and the extrinsic calibration C_d2oh of the HWD display unit (e.g., in an optical or magnetic reference frame (Oa) of the headtracker system).

At a step 816, the HWD system updates the display alignment C_a2d of the display reference frame to the platform (aircraft) reference frame based on the updated headtracker alignment.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based head worn display (HWD) system, comprising:
   an aircraft positioning system configured to determine one or more of:
      a position and orientation (pose) of an aircraft relative to a navigational reference frame;
      an absolute position of the aircraft in an earth-centered reference frame;
      and
      a pose of the aircraft relative to a platform reference frame;
   a display unit associated with a display reference frame, the display unit configured to present display imagery to a wearer of the HWD;
   an optical-inertial headtracker configured for estimating a headtracker pose of a first optical reference frame with respect to a second optical reference frame;
   the HWD system associated with an alignment mode wherein the HWD system is configured to:
      define one or more far-field features proximate to the aircraft, each far-field feature corresponding to a three-dimensional (3D) position relative to the navigational reference frame;
      determine, via the aircraft positioning system, at least one feature pointing vector associated with each far-field feature, each feature pointing vector relative to the platform reference frame;
      estimate a nominal head pose for aligning the display reference frame to the platform reference frame, the nominal head pose configured to position the one or more far-field features within the display unit field of view (FOV);
      render, via the display unit, the one or more far-field features based on the at least one feature pointing vector and the nominal head pose;
      based on an alignment of the one or more rendered far-field features to their corresponding 3D positions, determine a latched headtracker pose;
      determine an updated headtracker alignment based on the nominal head pose, the latched headtracker pose, and an extrinsic calibration of the display unit relative to the first or second optical reference frame;
      update, based on the updated headtracker alignment, a display alignment for aligning the at least one feature pointing vector to the display reference frame.

2. The aircraft-based HWD system of claim 1, wherein:
   the display imagery includes the one or more rendered far-field features and their corresponding 3D positions; and wherein
   the display unit is configured for manual alignment by the wearer of the one or more rendered far-field features to their corresponding 3D positions;
   the HWD system is configured to receive a manual indication from the wearer of a successful alignment of the one or more rendered far-field features to their corresponding 3D positions, the successful alignment corresponding to the latched headtracker pose.

3. The aircraft-based HWD system of claim 2, wherein:
   the display imagery includes error symbology configured for assisting the wearer in the manual alignment of the one or more rendered far-field features to their corresponding 3D positions.

4. The aircraft-based HWD system of claim 1, wherein the display imagery includes the one or more rendered far-field features and their corresponding 3D positions, further comprising:
- at least one witness camera in data communication with the optical-inertial headtracker, the at least one witness camera associated with a camera reference frame, the at least one witness camera aligned with the field of view of the display unit and configured to capture the display imagery;
- and
- wherein the aligning of the one or more rendered far-field features to their corresponding 3D positions includes:
  - detecting the one or more rendered far-field features and their corresponding 3D positions within the display imagery, each detected rendered far-field feature associated with an observed location relative to the camera reference frame;
  - determining a discrepancy between the observed locations of the one or more rendered far-field features and their corresponding 3D positions;
  - and
  - updating the display alignment based on the determined discrepancy.

5. The aircraft-based HWD system of claim 1, further comprising:
- at least one witness camera in data communication with the optical-inertial headtracker, the at least one witness camera associated with an extrinsic camera calibration relative to the display reference frame;
- wherein the aligning of the one or more rendered far-field features to their corresponding 3D positions includes:
  - capturing display imagery via the witness camera;
  - detecting the 3D positions of the one or more far-field features within the display imagery;
  - determining at least one discrepancy between the at least one feature pointing vector and the corresponding 3D position of each far-field feature;
  - and
  - updating the display alignment based on the at least one determined discrepancy.

6. The aircraft-based HWD system of claim 1, wherein the optical-inertial headtracker is an inside-out headtracker comprising:
- at least one camera attached to the HWD;
- and
- a plurality of fiducial markers disposed within the aircraft and within the FOV of the at least one camera;
- wherein the first optical reference frame corresponds to a camera reference frame associated with the at least one camera;
- and
- wherein the second optical reference frame corresponds to a marker reference frame associated with the plurality of fiducial markers.

7. The aircraft-based HWD system of claim 1, wherein the optical-inertial headtracker is an outside-in headtracker comprising:
- at least one camera disposed within the aircraft;
- and
- a plurality of fiducial markers are attached to the head of the wearer and within a field of view of the at least one camera;
- wherein the first optical reference frame is associated with a marker reference frame corresponding to the plurality of fiducial markers;
- and
- wherein the second optical reference frame is associated with a camera reference frame corresponding to the at least one camera.

8. A method for conformal alignment of a headtracker for a head worn display (HWD) system, the method comprising:
- defining, via a processor of the HWD system, one or more far-field features proximate to an aircraft, each far-field feature corresponding to a three-dimensional (3D) position relative to a navigational reference frame;
- determining, via a positioning system of the aircraft, at least one feature pointing vector associated with each defined far-field feature, each feature pointing vector relative to a platform reference frame associated with the aircraft;
- estimating a nominal head pose for aligning a display reference frame to the platform reference frame, the display reference frame associated with a display unit of the HWD system, the nominal head pose configured for positioning the one or more far-field features within a field of view (FOV) of the display unit;
- rendering, via the display unit, the one or more far-field features based on the at least one feature pointing vector and the estimated nominal head pose;
- aligning the one or more rendered far-field features to their corresponding 3D positions;
- determining, via a processor of the HWD system, a latched headtracker pose associated with an optical-inertial headtracker of the HWD system, the latched headtracker pose corresponding to a successful alignment of the one or more rendered far-field features to their corresponding 3D positions;
- determining, via the processor, an updated headtracker alignment associated with the optical-inertial headtracker, the updated headtracker alignment based on the nominal head pose, the latched headtracker pose, and an extrinsic calibration of the display unit relative to an optical reference frame of the headtracker;
- and
- updating, via the processor, a display alignment for aligning the at least one feature pointing vector to the display reference frame based on the updated headtracker alignment.

9. The method of claim 8, wherein aligning the one or more rendered far-field features to their corresponding 3D positions includes:
- presenting, via the display unit, display imagery including the one or more rendered far-field features and their corresponding 3D positions;
- performing, via a wearer of the HWD system, a manual alignment of the one or more rendered far-field features to their corresponding 3D positions;
- receiving, via the HWD system, an indication of a successful manual alignment from the wearer, the successful manual alignment corresponding to the latched headtracker pose.

10. The method of claim 9, wherein presenting, via the display unit, display imagery including the one or more rendered far-field features and their corresponding 3D positions includes:
- presenting, via the display unit, error symbology configured for assisting the manual alignment of the one or more rendered far-field features to their corresponding 3D positions.

11. The method of claim 8, wherein aligning the display unit to a conformal pose includes:
   presenting, via the display unit, display imagery including the one or more rendered far-field features and their corresponding 3D positions;
   capturing the display imagery via a witness camera in data communication with the HWD system, the witness camera aligned with a field of view of the display unit and associated with a camera reference frame;
   detecting, via the HWD system, the one or more rendered far-field features and their corresponding 3D positions within the display imagery, each detected rendered far-field feature associated with an observed location relative to the camera reference frame;
   determining, via the HWD system, at least one discrepancy between the observed locations of the one or more rendered far-field features and their corresponding 3D positions;
   and
   wherein updating, via the processor, a display alignment includes updating the display alignment based on the at least one determined discrepancy.

12. The method of claim 8, wherein aligning the display unit to a conformal pose includes:
   capturing display imagery via a witness camera in data communication with the HWD system, the witness camera associated with an extrinsic camera calibration relative to the display reference frame;
   detecting within the display imagery the 3D positions of the one or more far-field features;
   determining at least one discrepancy between the at least one feature pointing vector and the corresponding 3D position of each detected far-field feature;
   and
   wherein updating, via the processor, a display alignment includes updating the display alignment based on the at least one determined discrepancy.

13. The method of claim 8, wherein the optical-inertial headtracker is an inside-out headtracker comprising:
   at least one camera attached to the HWD, the at least one camera associated with a camera reference frame;
   and
   a plurality of fiducial markers disposed within the aircraft and within the FOV of the at least one camera, the plurality of fiducial markers associated with a marker reference frame.

14. The method of claim 8, wherein the optical-inertial headtracker is an outside-in headtracker comprising:
   at least one camera disposed within the aircraft, the at least one camera associated with a camera reference frame;
   and
   a plurality of fiducial markers attached to the head of the wearer and within a field of view of the at least one camera, the plurality of fiducial markers associated with a marker reference frame.

\* \* \* \* \*